(12) United States Patent
Severson

(10) Patent No.: US 7,743,620 B1
(45) Date of Patent: Jun. 29, 2010

(54) COOLING SYSTEM

(76) Inventor: Ron W. Severson, 7782 N. Fancher, Clovis, CA (US) 93611

( * ) Notice: Subject to any disclaimer, the term of this patent is extended or adjusted under 35 U.S.C. 154(b) by 163 days.

(21) Appl. No.: 11/761,714

(22) Filed: Jun. 12, 2007

(51) Int. Cl.
*F25D 23/12* (2006.01)

(52) U.S. Cl. .................................. 62/259.4

(58) Field of Classification Search ............... 62/259.4, 62/304, 515
See application file for complete search history.

(56) References Cited

U.S. PATENT DOCUMENTS

| | | | |
|---|---|---|---|
| D244,294 S | 5/1977 | Glasoe | |
| 4,066,118 A * | 1/1978 | Goettl | ............... 165/236 |
| 4,761,965 A | 8/1988 | Viner | |
| 4,879,075 A | 11/1989 | Hinton | |
| 4,951,480 A | 8/1990 | Brence | |
| 5,353,601 A | 10/1994 | Palmer | |
| 5,778,696 A | 7/1998 | Conner | |
| 2002/0155807 A1 * | 10/2002 | Moor et al. | ............... 454/342 |
| 2006/0032258 A1 * | 2/2006 | Pruitt et al. | ............... 62/310 |

* cited by examiner

*Primary Examiner*—Melvin Jones
(74) *Attorney, Agent, or Firm*—Advantia Law Group; Michael W. Starkweather

(57) ABSTRACT

A cooling system for cooling a structure. There is a refrigeration cooling unit; a duct system of the refrigeration cooling unit; an evaporative cooling unit in fluid communication with the attic, and in thermal communication with the duct system; and an exhaust fan providing fluid communication between the attic and an exterior of the structure. The cooling system includes a smoke detector, such that activation of the smoke detector deactivates the evaporative cooling unit. The exhaust fan and the evaporative cooling unit are in logical communication such that activation of the evaporative cooling unit activates the exhaust fan. The exhaust fan is adjacent the duct system. The evaporative cooling unit includes a thermostat in thermal communication with the attic and in control of the evaporative cooling unit according to a threshold temperature of the attic.

6 Claims, 2 Drawing Sheets

COOLING SYSTEM

BACKGROUND OF THE INVENTION

1. Field of the Invention

The present invention relates generally to systems for cooling air within a building structure and, more particularly, to combined cooling systems.

2. Description of the Related Art

In the related art, it has been known to use devices to evaporatively cool air within building structures whether they be residential or commercial. It is known that heat from the sun may cause structures which house people to heat up resulting in uncomfortable temperatures within such structures. It is often desired by people for systems to be employed to reduce the temperatures within these naturally overheated structures. Various cooling systems exist for such purposes. Often such cooling systems focus on circulating air within the structures and cooling the air by means of evaporative cooling and/or refrigeration cycles. Often there are spaces such as attics or overhead crawlspaces which are not cooled. Since heat flows from a high to a low, any duct work present in such spaces is heated by the hotter air within such space thereby minimizing the effect of the air conditioning. Therefore there is a need for a cooling system which effectively and efficiently cools overhead spaces thereby maximizing the operation of the entire cooling system which maintains comfortable temperatures in the human occupied space of structures. Some improvements have been made in the field. Examples include but are not limited to the references described below, which references are incorporated by reference herein:

U.S. Pat. No. 5,353,601, entitled Structural Cooling Systems And Methods, discloses an evaporative cooling system. Specifically, there is a structural cooling system which includes an evaporative cooler suitable for cooling a body of air in an upper, enclosed chamber of a structure, such as an attic, and a series of vents or ducts, particularly around the perimeter of the building, for applying the cooled air selectively to high heat-gain portions of the exterior of the structure. An interior cooling system, which may include an air-conditioning unit, is suitable for cooling the interior of the building, but will require only reduced capacity, because of the cooling effect on the structure's exterior.

U.S. Pat. No. 4,879,075, entitled Evaporative Air Cooling Apparatus, discloses an evaporative cooling system. Specifically, there is an evaporative cooler apparatus and method of operation that was conceived and developed to humidify and cool the attic space between the roof and the ceiling of man-made buildings or other structures. The apparatus is comprised of an induced draft fan assembly which blows air through an evaporation bundle comprised of one or more concentric cylinders of fibrous evaporation pads. The most advantageous embodiments of the invention and optimum parameters of operation result in reduced costs for installation, for evaporation water, for electrical power, and for service and maintenance as compared with devices of the prior art.

U.S. Pat. No. 4,761,965, entitled Evaporative Roof Cooling System, discloses an evaporative cooling system. Specifically, there is an evaporative roof cooling system for placement upon a roof surface exposed to relatively high levels of solar radiation. The system includes water distribution piping and a plurality of mist/spray nozzles positioned on the roof surface for supplying a uniform spray of water thereover to lay down a substantially uniform thin film of water on the roof surface. A solenoid-controlled valve controls the supply of water to the system over periods during which the temperature of the roof surface is measured to be within a predetermined temperature range. A thermistor, encapsulated in an epoxy block, is affixed to the roof surface and monitors and measures the actual roof temperature. Cooling systems control circuitry, in electric communication with the thermistor and the solenoid-controlled valve, compares the electric resistance value developed by the thermistor and a range of current values related to the predetermined temperature range and directs the opening of such valve when the termister senses the high point temperature of such range and the closing of such valve when the thermister senses the low point temperature of such range whereby the mist/sprays of water discharged from the nozzles evaporatively cool the roof surface.

U.S. Pat. No. 4,951,480, entitled Evaporative Cooling Device and Process, discloses an evaporative cooling system. Specifically, there is an evaporative cooling unit which fits within a building wall. The evaporative cooling unit includes a remote fan which pulls air through the unit into a space to be cooled and also exhausts warm air from the space.

U.S. Pat. No. 5,778,696, entitled Method And Apparatus For Cooling Air And Water, discloses an evaporative cooling system. Specifically, there is an invention that provides a method and apparatus for efficiently using various components as a system for cooling air. The apparatus uses the combination of an evaporative cooler, a refrigerated air system with a water-cooled condenser, a swimming pool pump, and a swimming pool or other bulk water storage container. A pump or series of pumps are used to supply water to the evaporative cooler and to the water-cooled condenser from the swimming pool. After the swimming pool water has been supplied to the other components in the system, it is returned to the swimming pool. During cooler weather, the output air from the evaporative cooler is supplied to a series of ducts and is used to cool the interior of a structure such as a home. When the outside ambient temperature and/or humidity levels exceeds the capabilities of the evaporative cooler for cooling the interior of the structure to the desired temperature, the output air from the evaporative cooler is re-directed to the attic space of the structure and the refrigerated air from the refrigerated air system is used to cool the interior of the structure. By using the output air from the evaporative cooler to cool the attic space, the overall cooling load on the refrigerated air system is reduced. In addition, the use of the water from the swimming pool to condense the refrigerant vapors will enable the system to achieve even greater efficiency and will provide an added benefit of lowering the temperature of the water stored in the swimming pool.

U.S. Pat. Des. 244,294, entitled Evaporative Cooler, discloses an ornamental design for an evaporative cooler.

The inventions heretofore known suffer from a number of disadvantages which include unduly complex, limited application, difficult to operate, difficult to install, unduly large, unreliable, and/or fail to independently and/or exclusively cool the attic space effectively, efficiently and/or conveniently.

What is needed is an attic evaporative cooling system that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available cooling systems. Accordingly, the present invention has been developed to provide a system for using an evaporative cooler placed in an unfinished attic of a structure such as a dwelling or business so as to cool the attic and thus increase the comfort of the primary living and/or working space of the structure as well as the comfort of the attic space itself and/or increase the efficiency of any existing central air-conditioning system(s).

In one embodiment there is a cooling system for cooling a structure. There may be a refrigeration cooling unit; a duct system which may be in fluid communication with the refrigeration cooling unit and/or may extend through an attic of the structure; an evaporative cooling unit which may be disposed at a first end of the attic, the unit may be in fluid communication with the attic, and/or in thermal communication with the duct system through air in the attic; and/or an exhaust fan which may be disposed at a second end of the attic substantially opposite the first end and may provide fluid communication between the attic and an exterior of the structure.

The cooling system therein may include a smoke detector which may be in communication with the evaporative cooling unit such that activation of the smoke detector deactivates the evaporative cooling unit. Further, wherein the exhaust fan and the evaporative cooling unit may be in logical communication such that activation of the evaporative cooling unit activates the exhaust fan. Further, wherein the exhaust fan may be adjacent the duct system. Further, wherein the evaporative cooling unit may include a thermostat which may be in thermal communication with the attic and/or in control of an activation state of the evaporative cooling unit according to a threshold temperature of the attic.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
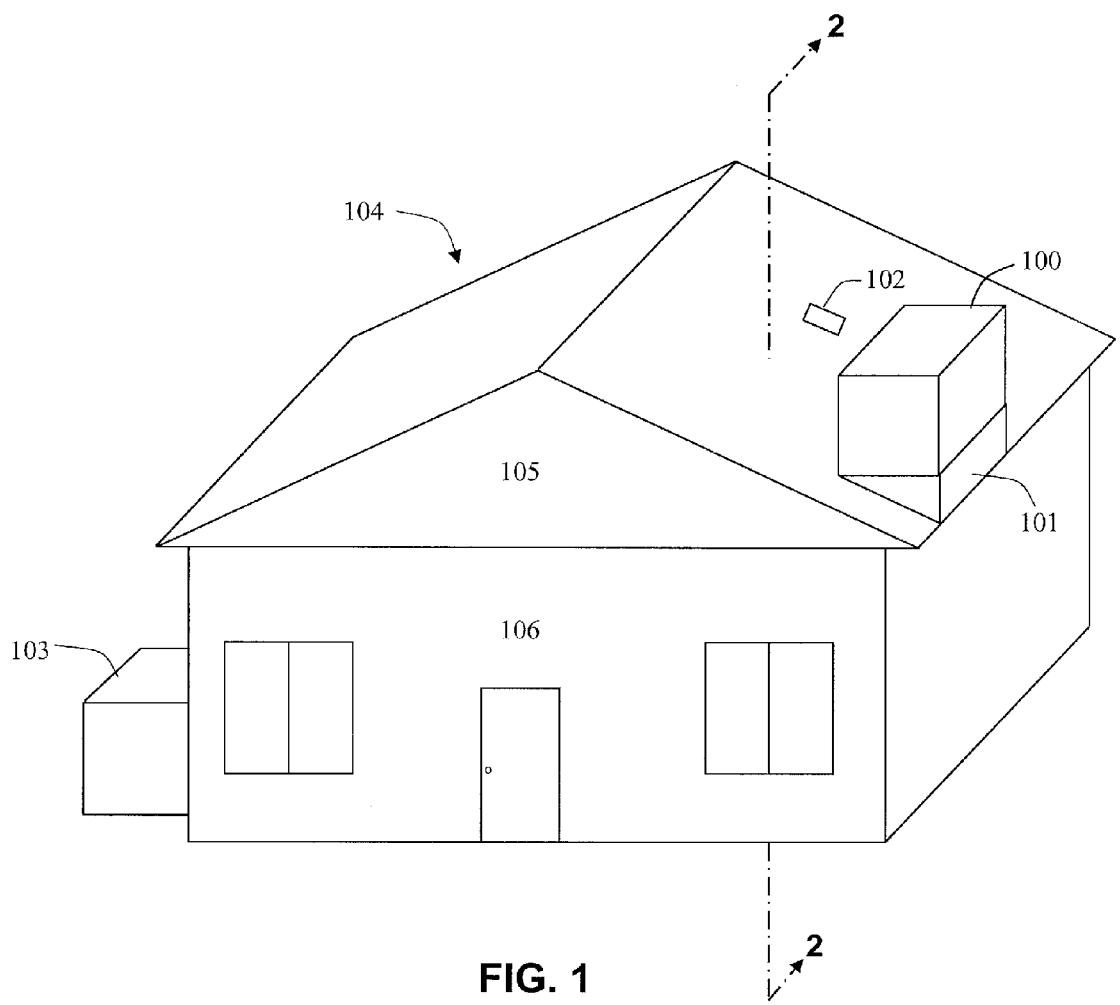
FIG. 1 illustrates a perspective view of a structure where a cooling system is incorporated, representing one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

FIG. 1 illustrates a perspective view of a structure where a cooling system is incorporated, representing one embodiment of the invention. Represented in FIG. 1 is an evaporative cooling unit 100 which may be mounted on the roof of a structure 104; generally shown as a house in FIG. 1. A particularly designed roof mounting structure 101 securely holds the unit 100 on the roof. There is represented, in one embodiment, an emergency air/smoke vent 102 which functions to open and allow air to flow from within the attic of the structure 104. Also embodied is a refrigerated air cooling unit 103, which functions to cool the living space 106 of the structure 104. There is represented in FIG. 1 the distinction between a living space 106 and an attic 105 space of the structure 104.

As illustrated, according to one embodiment, each space is a closed volume such that mixing of air does not occur.

Further, it is envisioned, that the evaporative cooling unit 100 may be positioned in a variety of different location upon, attached to, or beside the structure 104 to be cooled. One skilled in the art may select an appropriate position relative to the respective configuration of each structure. The evaporative cooling unit 100 may be AC powered, solar powered, gas powered, or powered by a combination of such forms of power.

It is envisioned, that the refrigerated air cooling unit 103 may be located according to what may be preferred for energy efficiency, aesthetic appeal, and/or minimize noise and/or air flow nuisance. As such there are locations which may contribute to energy savings to the entire cooling system. The refrigerated air cooling unit 103 may be AC powered, solar powered, gas powered, or powered by a combination of such forms of power.

Figure 2:
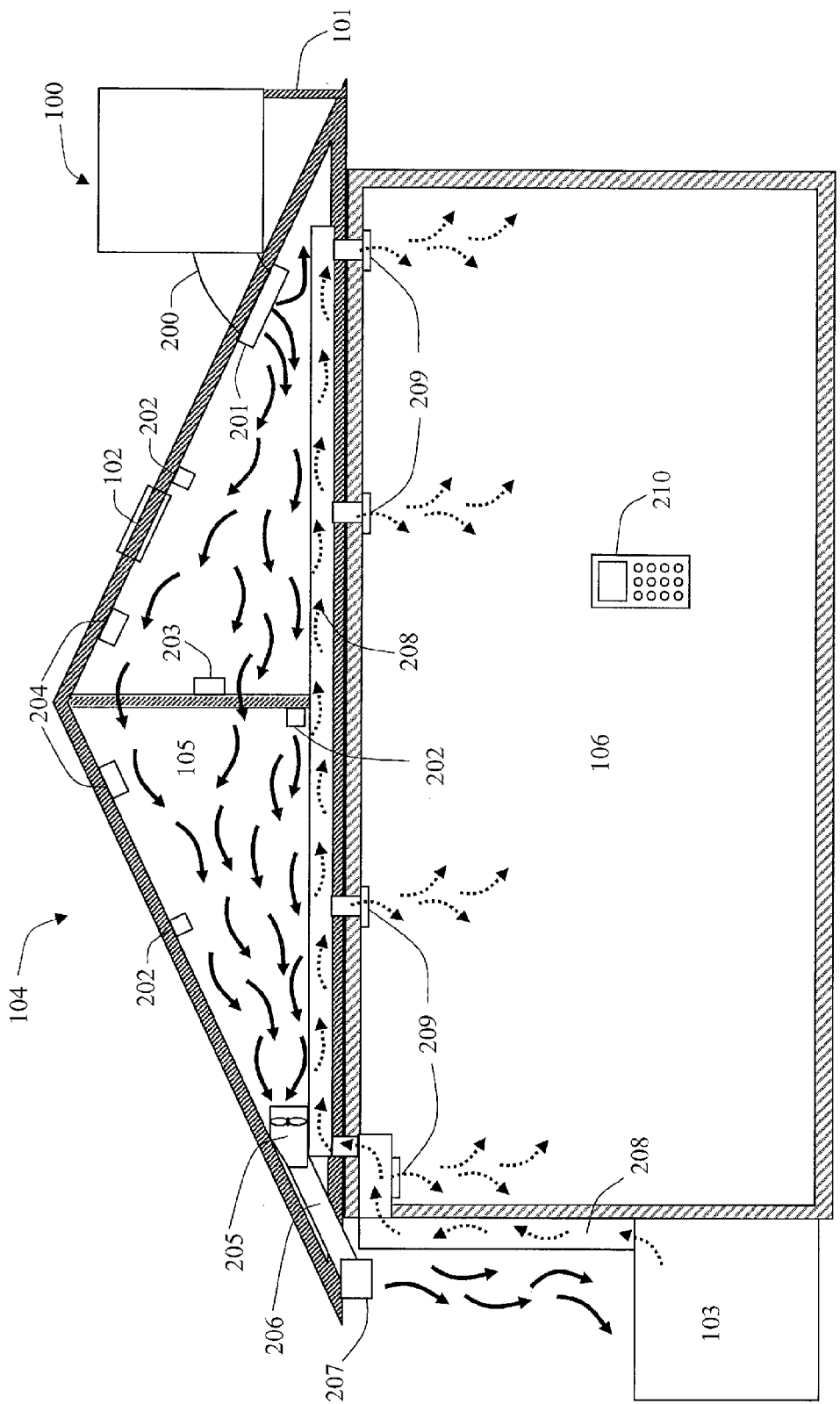
FIG. 2 illustrates a front cross sectional view of a structure where a cooling system is incorporated, representing one embodiment of the invention.

FIG. 2 illustrates a front cross sectional view of the structure 104 shown in FIG. 1. FIG. 2 shows a view of the structure 104 as would be seen if the front portion of the structure 104 were cut away, as indicated by the 2-2 cut line in the perspective view of FIG. 1. As shown the evaporative cooling unit 100 is positioned on the lower portion of one side of the structures 104 roof. An example of such an evaporative cooler is the Alpine RW3000, AdobeAir, Inc., 1450 East Grant Street, Phoenix, Ariz. 85034. At this position it is likely to be in a minimally conspicuous location on the roof. The evaporative cooling unit 100 produces cooled air which is expelled into the attic 105 via an air distribution duct 200 and a distribution vent 201.

Further, in one embodiment, the air distribution duct 200 is fixably attached to fully encompass the outlet of the evaporative cooling unit 100. The air distribution duct 200 extends from the outlet of the evaporative cooling unit 100 through an appropriately sized hole in the roof, and ends at some point just inside the attic 105 space. The interface between the roof material and the air distribution duct 200 is tight, being sealed and insulated with material know in the art for such purposes. In FIG. 2, the end of the air distribution duct 200 is disposed within the attic space and is fixably attached to the distribution vent 201. The distribution vent 201 is configured such that the air passing through it may be channeled in selectable directions. The distribution vent 201 air flow directional surfaces are adjustable so that the direction of air flow may be optimized for each application. Such air distribution duct 200 and distribution vent 201 are sufficiently sized to allow free flow of cooled air from the evaporative cooling unit 100. The air distribution duct 200 is comprised of materials and connected to attic 105 such that energy gain to the cooled air is minimized. Heretofore descriptions have set forth where and how the cooled air gets into the attic 105 space.

As illustrated in FIG. 2, the air in the attic 105 is monitored by various sensors. The sensors lend to the regulation of air flow and temperature of the attic 105 space through determining when activation or deactivation of the system is to occur. Such activation and deactivation occurs at the satisfaction of preset parameters. In one embodiment, preset parameters and direct control is had via a user control panel 210 which is located within the living space 106. In one embodiment there is a wireless remote control device that controls a thermostat 204 and thereby serves as the user control panel 210. An example of a remote controlled thermostat includes the GE RAK147D1 Remote Control Wall Thermostat, General Electric Company 3135 Easton Turnpike Fairfield, Conn. 06828. Being a wireless remote control device the user control panel 210 communicates by wireless signal provided such control is affected within the effective range of such. According to one embodiment, the temperature limits are controlled by the user from within the living space 106 using the control panel 210. Additionally, besides setting the temperatures of operation of the evaporative cooling unit 100 via the thermostat 204, operation may be terminated, continuous operation may be initiated, the current temperature may be monitored, as well as the fan may be independently operated.

Additionally, there are represented, in FIG. 2, smoke detectors 202 positioned in various locations of the attic 105 for safety precaution. An example of such a smoke detector includes the B224BI Plug-in Isolator Detector Base by System Sensor, 3825 Ohio Avenue, St. Charles, Ill. 60174. In FIG. 2, the smoke detectors 202 are fixably attached to the support members within the attic 105 space. One skilled in the art determines the appropriate locations for the smoke detectors 202 so as to comply with regulations, building codes and for optimal smoke detection. According to one embodiment, the smoke detectors 202 are in electronic communication with the evaporative cooling unit 100.

There is also represented, in FIG. 2, a pressure/humidity sensor 203 which determines when the emergency air vent 102 is to be opened to allow pressure and/or humidity normalization of the attic 105 space. In one embodiment, the pressure/humidity sensor 203 is composed of two separate systems, one for sensing the pressure and one for sensing the humidity within the attic 105. An example of such a pressure sensor includes, U.S. Pat. No. 5,079,953, incorporated by reference herein, discloses a Pressure Gage. An example of such a humidity sensor system, U.S. Pat. No. 6,157,306, incorporated by reference herein, discloses a Humidity Sensing System for a Storage Container. According to one embodiment the pressure/humidity sensor 203 system is fixably attached to a support member within the attic 105 space. As illustrated in FIG. 2 the location of the attachment is at a central point within the attic 105 space. The pressure/humidity sensor 203 is in communication by electronic wire to the emergency air vent 102. In one embodiment, there is a hole in the structures 104 roof wherein the emergency air vent 102 is fixably attached such that air may pass from the attic 105 space therethrough to the environment without the roof. An example of such an emergency air vent, U.S. Pat. No. 7,013,950, incorporated by reference herein, discloses a Ventilation Device.

There is also represented, in FIG. 2, a thermostat 204 located within the attic 105 to monitor the temperature therein. An example of a thermostat includes the GE RAK147D1 Remote Control Wall Thermostat, General Electric Company 3135 Easton Turnpike Fairfield, Conn. 06828. The thermostats 204 are fixably attached to support members within the attic 105. As shown the locations thereof are at upper most points of the attic 105. Hot air being less dense than cool air will rise to the upper most section of the volume within the attic 105. It may be desirable to monitor the hottest area of the attic 105 space. The thermostats 204 are in communication by electronic wire with the evaporative cooling device 100. In one embodiment, such feedback communication is used determinatively by the evaporative cooling device 100 to activate, continue or deactivate cooling cycles.

According to one embodiment all mentioned sensors and feedback devices are intended for the safe and efficient operation of the evaporative cooling system 100 to thereby provide a safer environment in the attic 105. The plurality of sensors and locations thereof are determined specifically for each structure.

As illustrated in FIG. 2 the evaporative cooling unit 100 distributes cooled air into the attic 105 via the air distribution duct 200 and the distribution vent 201. Oppositely located within the attic 105 from the evaporative cooling unit 100 there is illustrated an exhaust fan 205 which draws air from the attic 105 space and expels it to the environment without, via an exhaust duct 206 and an exhaust vent 207. An example of such an exhaust fan includes the Power Gable Fan WF37, by NuTone Inc. 4820 Red Bank Road Cincinnati, Ohio 45227-1599. As illustrated in FIG. 2, the exhaust fan 205 is fixably attached to the interior structure of the attic 105 so as to be immovable. In one embodiment the exhaust fan 205 is in controlled communication by electronic wire with the evaporative cooling unit 100. According to one embodiment, when signaled from the evaporative cooling unit 100 the exhaust fan 205 is activated, modulated, or deactivated. The exhaust fan 205 is sized and powered to draw the air from the attic 105. One skilled in the art would determines the size and number of fans necessary to draw air from the attic 105 in accordance with the air flow in from the evaporative cooling unit 100. The exhaust fan 205 used may be AC powered, solar powered and/or otherwise powered.

Further, there is illustrated in FIG. 2, the exhaust duct 206 fixably attached to the back, down stream, end of the exhaust fan 205 housing. Additionally, in one embodiment, the exhaust duct 206 is fixably attached to the interior surface of the attic 105 so as to be immovable as it extends from the exhaust fan 205 to the exterior of the structure 104. The exhaust duct 206 is of sufficient cross sectional area to accommodate the flow of air provided by the exhaust fan 205. Illustrated in FIG. 2 the exhaust duct 206 channels the air to the exhaust vent 207 located on the soffit of the structure 104. In one embodiment the exhaust vent 207 is fixably attached to the end of the exhaust duct 206 as well as the soffit of the structure 104. In one embodiment the exhaust vent 207 is adjustable so as to direct the flow of air in whatsoever direction a user sets. In one embodiment, the exhaust vent 207 is of sufficient size to accommodate the flow of air out.

Illustrated in FIG. 2 is a refrigerated air cooling unit 103 which distributes cooled air into the living space 106 of the structure 104. An example of such a refrigerated air cooling unit includes, U.S. Pat. No. 7,003,976, incorporated by reference herein, discloses an Air Conditioner. As illustrated in FIG. 2 the cooled air flows from the refrigerated air cooling unit 103 through an air conditioning duct 208 and is distributed at various locations via air conditioning vents 209 which are conveniently and strategically placed throughout the living space 106 of the structure 104. In one embodiment the air conditioning duct 208 is fixably attached to the location of cool air output from the refrigerated air cooling unit 103. As illustrated in FIG. 2, the air conditioning duct 208 extends vertically from the connection at the refrigerated air cooling unit 103 until it reaches an uppermost position where it make a 90 degree turn such that it travels through a hole in the structure 104 wall to enter therein. As further illustrated, once the air conditioning duct 208 is within the structure 104 so as to be inconspicuous from the living space 106 the air conditioning duct 208 travels through the lowermost part of the attic 209 to thereby channel the cooled air to various locations for appropriate distribution into the living space 106. According to one embodiment, the portion of the air conditioning duct 208 that is within the attic 105 is fixably attached to support members therein, so as to be immoveable. As further illustrated in FIG. 2, there are points along the air conditioning duct 208 where air conditioning vents 209 are attached thereto. In one embodiment the air conditioning vents 209 are fixably attached at holes in the air conditioning duct 208 to allow for flow of cool air from the same to a location within the living space 106 of the structure 104. The air conditioning vents 209 are adjustable so as to allow direction and flow modulation of the cooled air.

In operation the refrigerated air conditioning unit 103 and associated distribution means, 208 and 209, are exclusive from the evaporative cooling unit 100. Keeping the evaporative cooling system exclusive from the refrigerated cooling system provides for better cooling of the entire structure 104 as well as eliminates the nuisance, in the living space 106, incumbent with humidified cooling systems such as dust and mold. The present invention does not intend to modify the hardware or embodiment of current refrigerated cooling systems present in homes. The present invention is intended to improve the operation of such air conditioning systems, by adding an evaporative cooling system for an attic. The improvement is made by reducing energy gain to the air that is transferred through the air conditioning ducts 208 before it is expelled from the air conditioning vents 209. Reducing the energy gain, or heat transfer to the ducts, ultimately reduces the energy necessary to cool the living space 106 of the structure 104.

In operation it is intended that the evaporative cooling unit 100 keep the attic 105 temperature between selected temperature limits, such as 85-95 degrees Fahrenheit. In one embodiment the thermostats 204 provide feedback to the evaporative cooling unit 100, such that when a selected maximum temperature is reached the evaporative cooling unit 100 is activated to send cooled air into the attic 105. In operation, according to one embodiment, when some lower temperature limit is reached the cooling stops. The exhaust fan 205 may be activated concurrent with the evaporative cooling unit 100. The exhaust fan 205 may draw air from the attic 105 thus created air circulation thereby enhancing the convective heat transfer from attic 105. Further, the exhaust fan 205 may also be operated while the evaporative cooling unit 100 is not.

Additionally, the sensors incorporated into the cooling system may also govern its operation. According to one embodiment, when the smoke detectors 202 sense smoke in the attic 105 space a signal is communicated to the evaporative cooling unit 100 which triggers shut down of evaporative cooling unit 100 and the exhaust fan 205; thereby mitigating air flow. This mitigation of air flow may help reduce the propagation rate of the fire. Further, in one embodiment, signals from the pressure/humidity sensor 203 system may trigger the opening of the emergency air vent 102 when selected conditions exist. Such conditions may be determined according the configuration of the structure and the materials used in its construction.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

Then, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A cooling system for cooling a structure, comprising:
   a refrigeration cooling unit;
   a duct system in fluid communication with the refrigeration cooling unit and extending through an attic of the structure;
   an evaporative cooling unit disposed at a first end of the attic, unit in fluid communication with the attic, and in thermal communication with the duct system through air in the attic;
   an exhaust fan disposed at a second end of the attic substantially opposite the first end and providing fluid communication between the attic and an exterior of the structure; and
   a smoke detector in communication with the evaporative cooling unit such that activation of the smoke detector deactivates the evaporative cooling unit;
   wherein the exhaust fan and the evaporative cooling unit are in logical communication such that activation of the evaporative cooling unit activates the exhaust fan.

2. The cooling system of claim 1, wherein the exhaust fan is adjacent the duct system.

3. The cooling system of claim 2, wherein the evaporative cooling unit includes a thermostat in thermal communication with the attic and in control of an activation state of the evaporative cooling unit according to a threshold temperature of the attic.

4. A cooling system for cooling a structure, consisting essentially of:
   a refrigeration cooling unit;
   a duct system in fluid communication with the refrigeration cooling unit and extending through an attic of the structure;
   an evaporative cooling unit disposed at a first end of the attic, unit in fluid communication with the attic, and in thermal communication with the duct system through air in the attic;
   an exhaust fan disposed at a second end of the attic substantially opposite the first end and providing fluid communication between the attic and an exterior of the structure; and
   a smoke detector in communication with the evaporative cooling unit such that activation of the smoke detector deactivates the evaporative cooling unit;
   wherein the exhaust fan and the evaporative cooling unit are in logical communication such that activation of the evaporative cooling unit activates the exhaust fan.

5. The cooling system of claim 4, wherein the exhaust fan is adjacent the duct system.

6. The cooling system of claim 5, wherein the evaporative cooling unit includes a thermostat in thermal communication with the attic and in control of an activation state of the evaporative cooling unit according to a threshold temperature of the attic.

* * * * *